(12) United States Patent
Wang

(10) Patent No.: US 7,568,869 B2
(45) Date of Patent: Aug. 4, 2009

(54) WELD NUT

(75) Inventor: Hendry Wang, Fongshan (TW)

(73) Assignee: Sumeeko Industries Co., Ltd., Kaohsiung Hsien (TW)

( * ) Notice: Subject to any disclaimer, the term of this patent is extended or adjusted under 35 U.S.C. 154(b) by 351 days.

(21) Appl. No.: 11/521,131

(22) Filed: Sep. 14, 2006

(65) Prior Publication Data

US 2007/0212193 A1    Sep. 13, 2007

(30) Foreign Application Priority Data

Mar. 9, 2006    (TW) .............................. 095203883 U

(51) Int. Cl.
*F16B 37/06*    (2006.01)

(52) U.S. Cl. ...................... 411/171; 411/174

(58) Field of Classification Search ......... 411/171–175, 411/432, 533, 162
See application file for complete search history.

(56) References Cited

U.S. PATENT DOCUMENTS

| 3,020,987 A | * | 2/1962 | Schaurte | ..................... 403/179 |
|---|---|---|---|---|
| 4,676,706 A | * | 6/1987 | Inaba | ......................... 411/175 |
| 6,692,206 B1 | * | 2/2004 | Clinch et al. | ................. 411/171 |
| 2003/0063962 A1 | * | 4/2003 | Nilsen | ......................... 411/427 |
| 2003/0129041 A1 | * | 7/2003 | Mitts et al. | ................... 411/171 |

* cited by examiner

*Primary Examiner*—Gary Estremsky
(74) *Attorney, Agent, or Firm*—Alan Kamrath; Kamrath & Associates PA

(57) ABSTRACT

A weld nut has a base panel and a nut. The base panel has a through hole formed therethrough and multiple weld points formed on a bottom thereof. The nut is mounted securely in the through hole in the base panel and has a nut body, a connecting section and a threaded hole. The connecting section is formed on and protrudes axially from the nut body and is mounted securely in the through hole. The threaded hole is formed through the nut body and the connecting section to screw with a bolt. The base panel has a lower carbon content and has an excellent weldability to make the weld points easy to be welded on a workpiece. The nut has a higher carbon content and has an enhanced hardness to prevent deformation resulting from an axial force.

7 Claims, 5 Drawing Sheets

WELD NUT

BACKGROUND OF THE INVENTION

1. Field of the Invention

The present invention relates to a weld nut and, more particularly, to a weld nut which has a nut and a base panel mounted securely with the nut to improve a hardness and a weldability of the weld nut.

2. Description of Related Art

With reference to FIGS. 8 and 9, a conventional weld nut (50) in accordance with the prior art has a diameter, a bottom, a threaded hole and multiple weld points (51). The threaded hole is formed through the weld nut(50). The weld points (51) are formed on and protrude from the bottom of the weld nut (50) around the threaded hole at intervals to be welded on a workpiece and to securely mount the weld nut (50) on the workpiece. The weld points (51) are preferable to have a carbon content less than 25% to raise a weldability of the weld nut(50) being welded on the workpiece. With being welded on a workpiece, the weld nut (50) does not cause vibrations during screwing a bolt onto the weld nut (50). Additionally, the weld nut (50) remains engaged securely with the workpiece and does not detach from the workpiece even when a huge external force strikes onto the workpiece.

However, the weld nut (50) is formed as an integral single piece and has a uniform carbon content. With the carbon content less than 25%, a hardness of the weld nut (50) is insufficient and the weld nut (50) is easily deformed and detached from the workpiece by an external force.

Further, each interval between adjacent weld points (51) is shorter than the diameter of the weld nut (50), and this part on the workpiece will result in brittle destruction on the workpiece due to quench hardening when the weld points (51) are melted for welding.

SUMMARY OF THE INVENTION

The primary objective of the present invention is to provide a weld nut to mitigate or obviate the aforementioned problems.

The weld nut in accordance with the present invention comprises a base panel and a nut. The base panel has a top, a bottom, a through hole formed longitudinally through the base panel and multiple weld points formed on and protruding from the bottom of the base panel.

The nut is mounted securely in the through hole in the base panel and has a nut body, a connecting section, a stabilizing flange and a threaded hole. The nut body has a proximal end and an outer wall. The connecting section is formed on and protrudes axially from the proximal end of the nut body, and is mounted securely in the through hole in the base panel. The stabilizing flange is formed on and protrudes radially from the outer wall of the nut body and has a bottom abutting with the top of the base panel. The threaded hole is formed through the nut body and the connecting section.

The nut and the base panel are manufactured individually, such that the nut and the base panel are capable of having different carbon contents. The base panel is preferable to have a carbon content lower than 25% to raise a weldability to make the weld points easily welded on a workpiece. The nut is preferable to have a carbon content higher than that of the base panel to raise a hardness of the nut so that the nut can bear an axial force.

Additionally, the bottom of the base panel has an area larger than that of a bottom of a conventional weld nut. Thus, the weld points of the base panel can be mounted on the bottom of the base panel at intervals and each interval between any two weld points is large enough to avoid causing high temperature to result in quench hardening or brittle destruction on partial portions of the workpiece, where the weld points are melted to be welded on.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
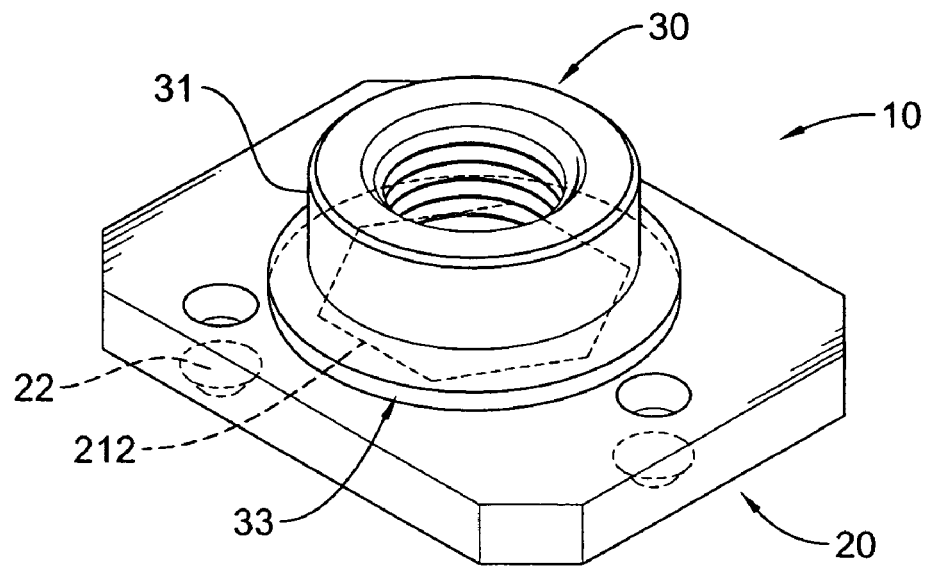
FIG. 1 is a perspective view of a first embodiment of a weld nut in accordance with the present invention.
Figure 2:
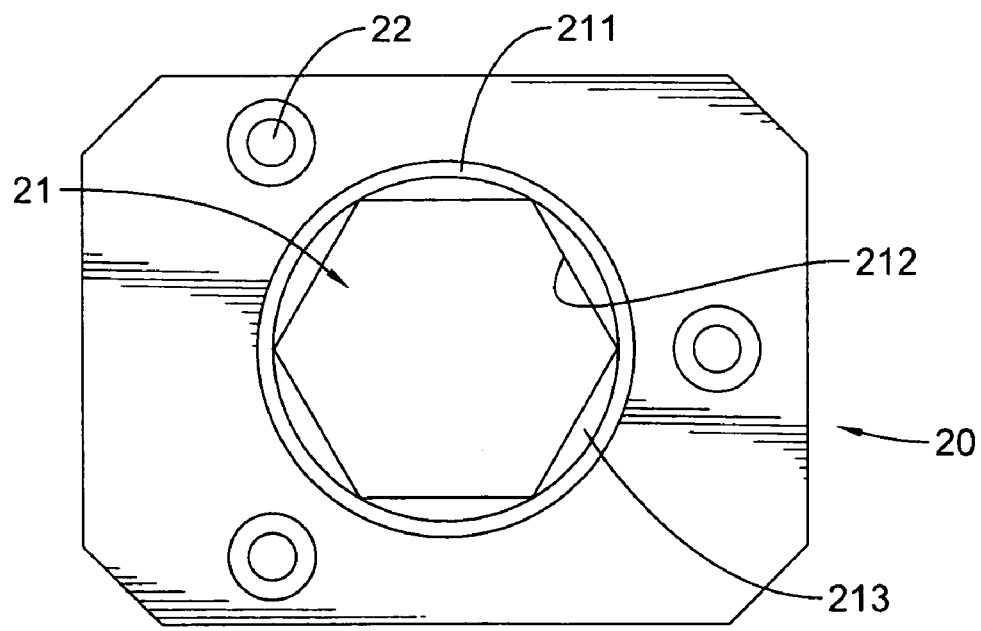
FIG. 2 is a bottom view of a base panel of the weld nut in FIG. 1.
Figure 3:
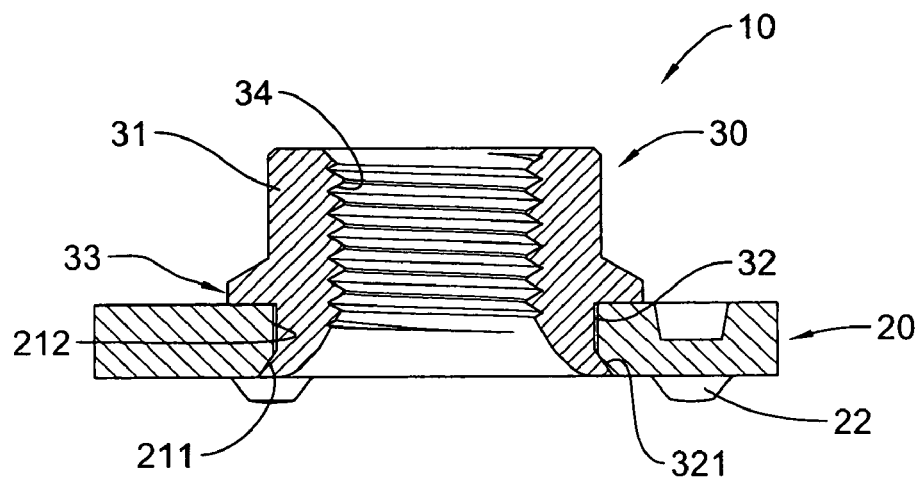
FIG. 3 is a cross sectional side view of the weld nut in FIG. 1.

With FIGS. 1-3 and 5, a weld nut (10) in accordance with the present invention comprises a base panel (20) and a nut (30).

The base panel (20) has a weldability, a carbon content, a top, a bottom, a through hole (21) and multiple weld points (22). The carbon content of the base panel (20) is preferred to be lower than 25% to raise the weldability of the base panel (20).

The through hole (21) is formed longitudinally through the base panel(20) and may be implemented with a polygonal recess (212) and a circular recess (211). The polygonal recess (212) is formed longitudinally in the top of the base panel (20) and may be a hexagonal recess. The circular recess (211) is formed longitudinally in the bottom of the base panel (20), communicates with the polygonal recess (212), forms a join surface (213) between the circular recess(211) and the polygonal recess (212) and may be tapered toward the top of the base panel (20).

Figure 4:
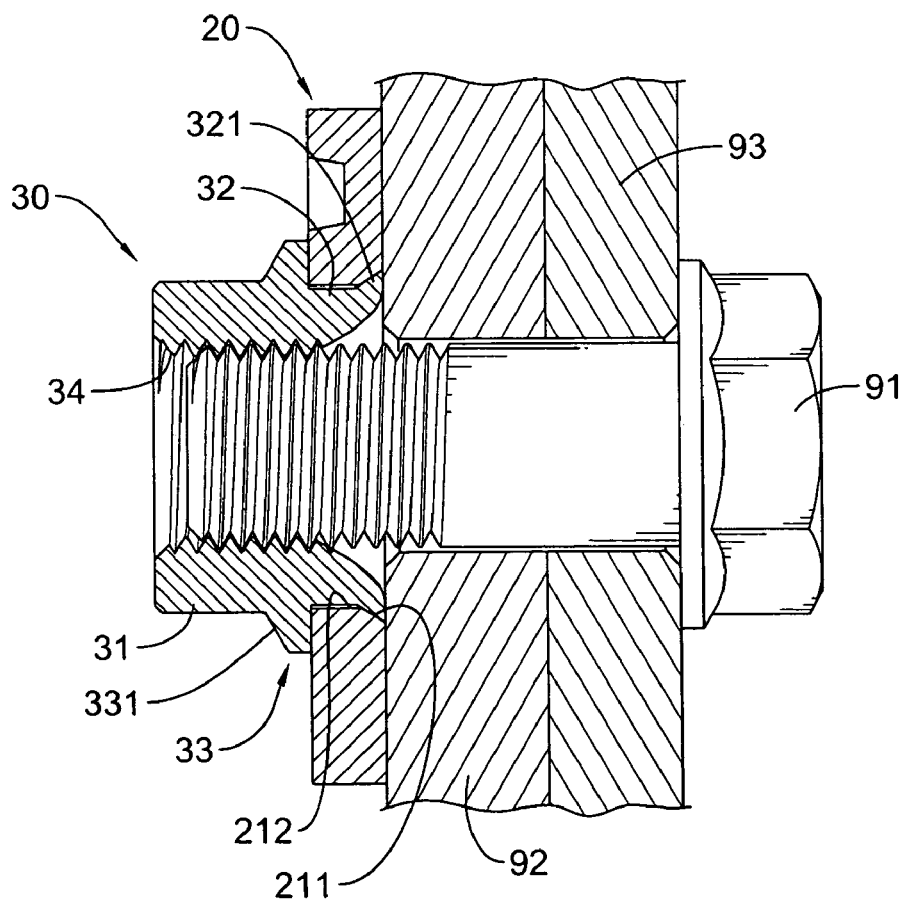
FIG. 4 is an operation side view in partial section of the weld nut in FIG. 1.
Figure 5:
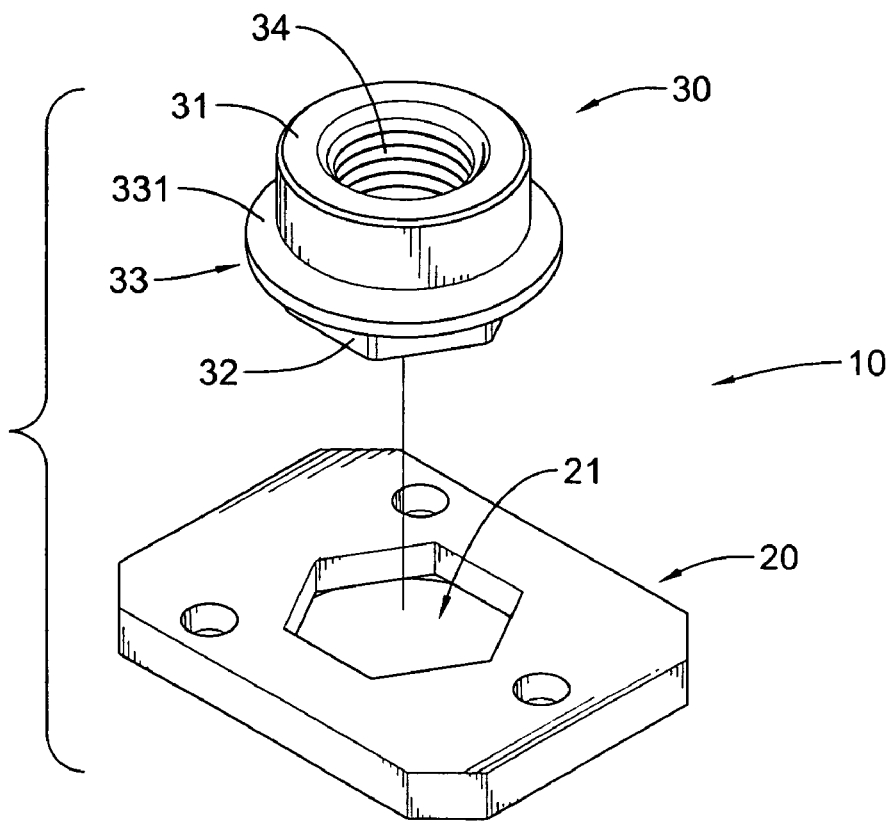
FIG. 5 is an exploded perspective view of the weld nut in FIG. 1.

The multiple weld points (22) are formed on and protrude from the bottom of the base panel (20) around the through hole (21) at intervals. With further reference to FIG. 4, the weld points (22) are melted and are welded on a workpiece (92) to mount the weld nut (10) on the workpiece (92).

The nut (30) is mounted securely in the through hole (21) in the base panel (20) and has a carbon content, a nut body (31, 31a, 31b), a connecting section (32), a stabilizing flange (33) and a threaded hole (34). The carbon content of the nut (30) is higher than that of the base panel (20) to have a reinforced hardness to keep from deformation.

With further reference to FIG. 4, when the nut (30) screws with a bolt (91), an axial force is generated, and the base panel

(20) will not be deformed due to the reinforced hardness of the nut (30) even when the axial force is overloaded.

Figure 6:
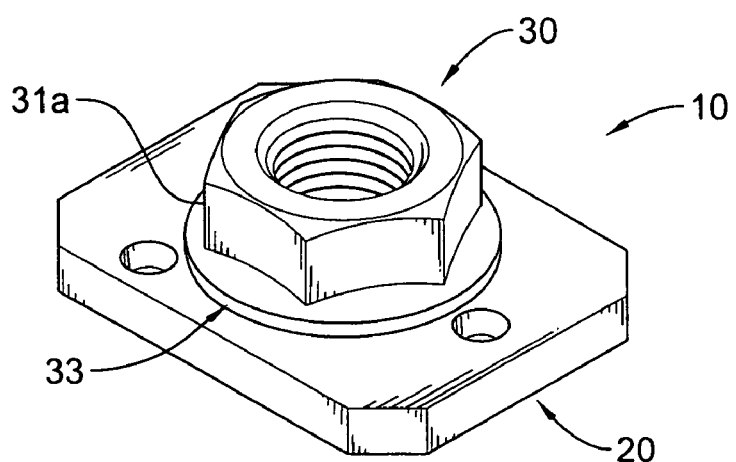
FIG. 6 is a perspective view of a second embodiment of the weld nut in accordance with the present invention with a nut having a hexagonal nut body.
Figure 7:
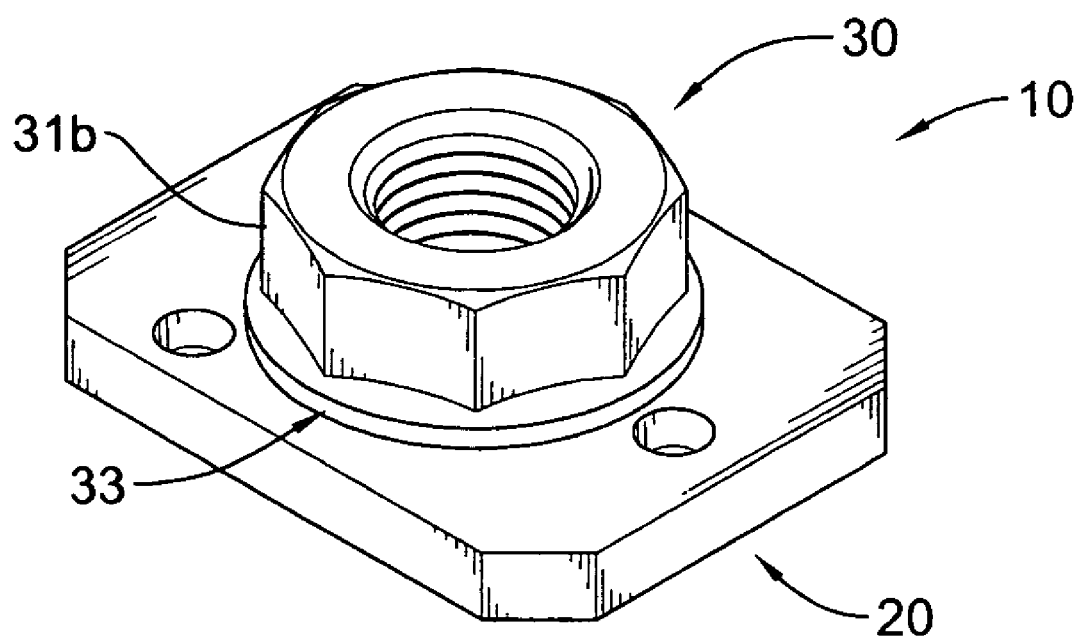
FIG. 7 is a perspective view of a third embodiment of the weld nut in accordance with the present invention with a nut having an octagonal nut body.
Figure 8:
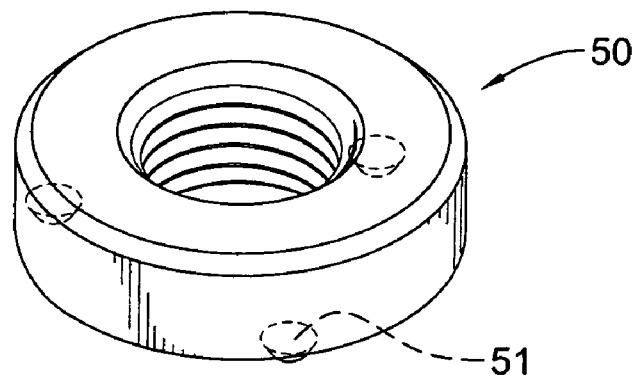
FIG. 8 is a perspective view of a conventional weld nut in accordance with the prior art.
Figure 9:
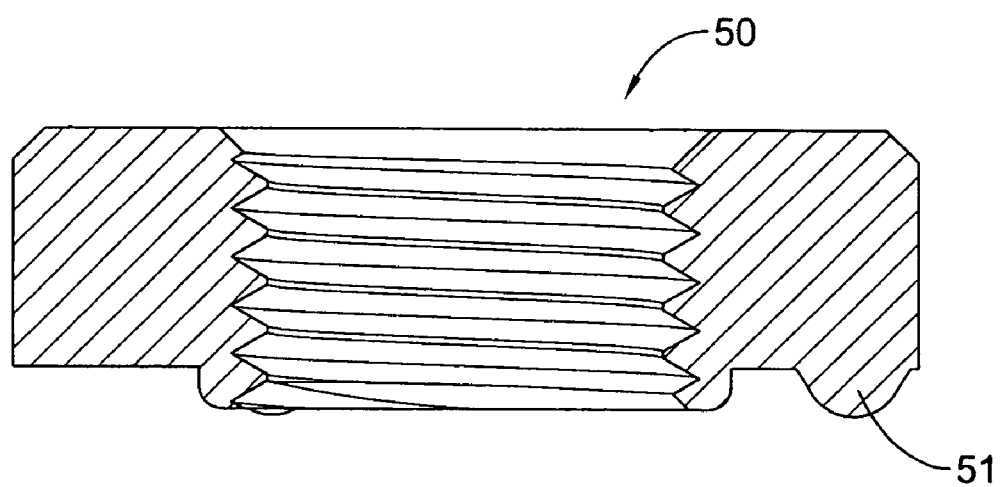
FIG. 9 is a cross sectional front view of the conventional weld nut in FIG. 8.

With further reference to FIGS. 6 and 7, the nut body (31, 31a, 31b) has a distal end, a proximal end and an outer wall and may be polygonal.

In a first embodiment of the nut body (31), the nut body (31) is circular. In a second embodiment of the nut body (31a), the nut body (31a) is hexagonal. In a third embodiment of the nut body (31b), the nut body (31b) is octagonal.

A diameter of the nut body (31, 31a, 31b) is shorter than the interval between any adjacent weld points (22). Accordingly, intervals among the weld points (22) are large enough to avoid causing quench hardening or brittle destruction on the workpiece (92) when the weld points (22) are melted and welded on the workpiece (92).

The connecting section (32) is formed on and protrudes axially from the proximal end of the nut body (31, 31a, 31b) and is mounted securely in the through hole (21) in the base panel (20). The connecting section may be mounted securely in the through hole (21) in a welding or coherence manner and may be a polygonal prism to be mounted correspondingly in the polygonal recess (212) to keep the nut (30) from rotation relative to the base panel (20).

The connecting section (32) has a distal end and an expanded flange (321). The expanded flange (321) is formed on and protrudes radially from the distal end of the connecting section (32) and abuts the join surface (213) between the circular recess (211) and the polygonal recess (212). The expanded flange (321) is formed by expanding the distal end of the connecting section (32) with a pressing process when the distal end of the connecting section 32 extends out of the through hole (21) in the base panel (20).

The stabilizing flange (33) is formed on and protrudes radially from the outer wall of the nut body (31, 31a, 31b) and has a top 331 and a bottom. The top 331 of the stabilizing flange (33) may be tapered off toward the distal end of the nut body (31, 31a, 31b) to avoid forming a sharp angle to hurt people. The bottom of the stabilizing flange (33) abuts with the top of the base panel (20). Accordingly, the base panel (20) is mounted securely between the stabilizing flange (33) and the expanded flange (321) of the nut (30).

The threaded hole (34) is formed through the nut body (31, 31a, 31b) and the connecting section (32) to allow the bolt (91) to screw with the threaded hole (34) and to fasten another workpiece (93) on the workpiece (92) on which the weld nut (10) is mounted.

The base panel (20) and the nut (30) are manufactured individually and have different carbon contents. The base panel (20) has a carbon content lower than 25% and has a high weldability. The nut (30) has a carbon content higher than that of the base panel (20) and has a high hardness. Accordingly, after the base panel (20) and the nut (30) are mounted together to form the weld nut (10), the weld nut (10) has both a high weldability to be easily welded on the workpiece (92) and a high hardness to bear an axial force when being fastened with the bolt (91).

Further, the intervals among the weld points (22) are large enough to avoid causing quench hardening or brittle destruction on the workpiece (92).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A weld nut comprising:
    a base panel having
        a top;
        a bottom;
        a through hole formed longitudinally through the base panel and including
            a polygonal recess formed longitudinally in the top of the base panel; and
            a circular recess formed longitudinally in the bottom of the base panel, communicating with the polygonal recess and forming a join surface between the circular recess and the polygonal recess; and
        multiple weld points formed on and protruding from the bottom of the base panel around the through hole; and
    a nut mounted securely in the through hole in the base panel and having
        a nut body having
            a distal end;
            a proximal end; and
            an outer wall;
        a connecting section formed on and protruding axially from the proximal end of the nut body, mounted securely in the through hole in the base panel and having
            a distal end; and
            an expanded flange formed on and protruding radially from the distal end of the connecting section and abutting the join surface between the circular recess and the polygonal recess;
        a stabilizing flange formed on and protruding radially from the outer wall of the nut body and having
            a top; and
            a bottom abutting with the top of the base panel; and
        a threaded hole formed through the nut body and the connecting section.

2. The weld nut as claimed in claim 1, wherein the top of the stabilizing flange is tapered toward the distal end of the nut body.

3. The weld nut as claimed in claim 1, wherein the circular recess is tapered off toward the top of the base panel.

4. The weld nut as claimed in claim 1, wherein
    the polygonal recess is a hexagonal recess; and
    the connecting section is a hexagonal prism to be mounted correspondingly in the polygonal recess.

5. The weld nut as claimed in claim 1, wherein the nut body is polygonal.

6. The weld nut as claimed in claim 5, wherein the nut body is hexagonal.

7. The weld nut as claimed in claim 5, wherein the nut body is octagonal.

* * * * *